United States Patent
Cartage et al.

(10) Patent No.: US 8,770,497 B2
(45) Date of Patent: Jul. 8, 2014

(54) DEVICE AND PROCESS FOR DISTRIBUTING A FLUID

(75) Inventors: Thierry Cartage, Brussels (BE); Olivier Jacques F. J. G. Bodson, Limal (BE); Marc Thijssen, Overijse (BE)

(73) Assignee: Solvay (Societe Anonyme), Brussels (BE)

( * ) Notice: Subject to any disclaimer, the term of this patent is extended or adjusted under 35 U.S.C. 154(b) by 624 days.

(21) Appl. No.: 12/609,757

(22) Filed: Oct. 30, 2009

(65) Prior Publication Data

US 2010/0107638 A1    May 6, 2010

(30) Foreign Application Priority Data

Oct. 31, 2008 (FR) .................................. 08 57436

(51) Int. Cl.
*B05B 1/20*     (2006.01)
*A62C 2/08*    (2006.01)
*A62C 37/08*   (2006.01)
*B05B 1/14*    (2006.01)

(52) U.S. Cl.
USPC .......... 239/566; 239/548; 423/215.5; 55/474; 261/87

(58) Field of Classification Search
USPC .............. 239/548–568, 599; 423/210, 215.5, 423/237; 261/18.1, 117, 87
See application file for complete search history.

(56) References Cited

U.S. PATENT DOCUMENTS

| | | |
|---|---|---|
| 1,773,522 A | 8/1930 | Delery et al. |
| 3,269,165 A | 8/1966 | Anderson et al. |
| 3,837,789 A * | 9/1974 | Schindler et al. ............ 431/354 |
| 4,073,439 A | 2/1978 | Grataloup |
| 4,195,785 A | 4/1980 | Blanzy |
| 4,401,695 A * | 8/1983 | Sopko .......................... 427/180 |
| 4,826,088 A | 5/1989 | Balmer |
| 5,048,431 A * | 9/1991 | Landreth et al. .............. 110/343 |
| 5,120,508 A | 6/1992 | Jones |

(Continued)

FOREIGN PATENT DOCUMENTS

| | | |
|---|---|---|
| DE | 3425963 | 1/1986 |
| DE | 3708941 | 9/1988 |

(Continued)

OTHER PUBLICATIONS

[Unknown Author] Standard ISO 4287 Oct. 1998—"GPS—Surface texture : profile method—Terms, definitions and surface texture parameters", 30 pgs.

(Continued)

*Primary Examiner* — Justin Jonaitis

(74) *Attorney, Agent, or Firm* — Beatrice C. Ortego

(57) ABSTRACT

Device for distributing a fluid in a controlled manner, in particular for distributing a gas loaded with particles, the device comprising a pipe (1) provided with at least one inlet orifice (2) and with a series of outlet orifices (3) spread along the pipe (1) and cut in the side wall of this pipe, characterized in that at least one section (4) of the wall, located downstream of at least one outlet orifice and limited by a section (5) of the edge of this orifice, has a shape such that this section of the edge of this orifice is positioned inside the pipe so that, when the device is in service, the flow direction of the fluid exiting this orifice and travelling along said wall section is controlled by the shape of the latter section.

15 Claims, 6 Drawing Sheets

(56) References Cited

U.S. PATENT DOCUMENTS

| | | | |
|---|---|---|---|
| 5,342,592 A * | 8/1994 | Peter-Hoblyn et al. | 423/235 |
| 5,681,536 A * | 10/1997 | Swoboda et al. | 422/168 |
| 6,916,174 B2 * | 7/2005 | O'Donnell et al. | 431/354 |
| 7,497,077 B2 * | 3/2009 | Dodge et al. | 60/286 |

FOREIGN PATENT DOCUMENTS

| | | |
|---|---|---|
| EP | 543705 | 5/1993 |
| GB | 1482310 | 8/1977 |
| JP | 06134349 | 5/1994 |
| JP | 2000/300142 | 10/2000 |
| WO | WO2006127746 | 11/2006 |

OTHER PUBLICATIONS

[Author Unknown]—"Full Cone Nozzles", Lechler, accessed online on May 9, 2013 at http://www.lechler.de/is-bin/intershop.static/WFS/LechlerUS-Shop-Site/LechlerUS-Shop/en_US/PDF/05_service_support/industrie/katalog/englisch/05_Full_Cone_Nozzles.pdf; 14 pgs.

Tilton, James E.—"Fluid and Particle Dynamics", Section 6 in Perry's Chemical Engineers' Handbook—7$^{th}$ Edition, 1997, Editors: Perry, Green & Maloney, published by McGraw-Hill, pp. 6-1 through 6-54;, 54 pgs.

Senecal, V.E.—"Fluid Distribution in Process Equipment", Jun. 1957, Ind. Eng. Chem., vol. 49, Issue No. 6, pp. 993-997; 5 pgs.

Shiomoto, G.H., et al—"Integrated Dry $No_x/SO_2$ Emissions Control System Calcium-Based Dry Sorbent Injection", Dec. 1, 1994, accessible online at http://www.osti.gov/bridge/product.biblio.jsp?query_id=2&page=0&osti_id=10120872&Row=22 &formname=advancedsearch.jsp ; OSTI Identifier: 10120872; Legacy ID: Report No. DE95007932; DOE/PC/90550—T14, DOE Contract No. FC22-91PC90550; 124 pgs.

* cited by examiner

Fig. 3
Fig. 3a
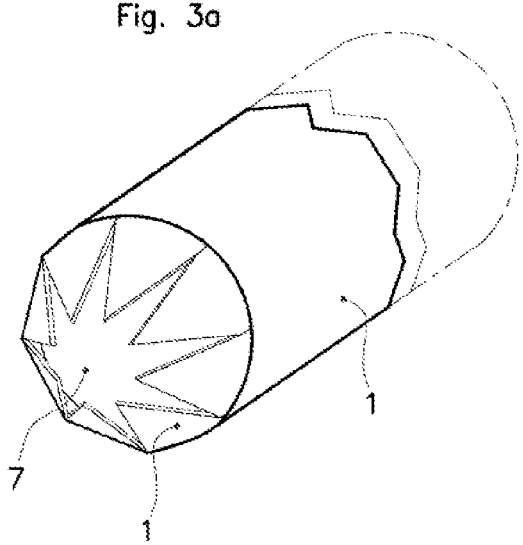
Fig. 3b
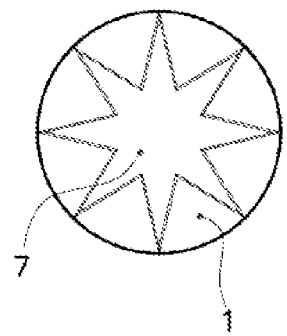
Fig. 4
Fig. 4a
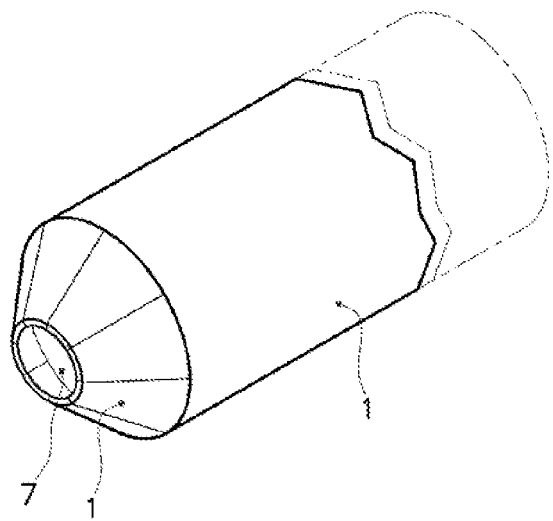
Fig. 4b
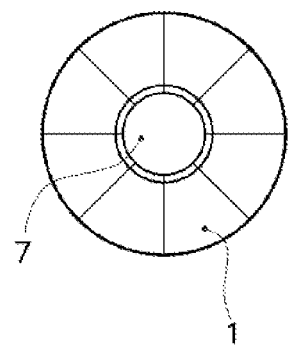

DEVICE AND PROCESS FOR DISTRIBUTING A FLUID

The invention relates to the distribution of fluids in a space by means of a pipe provided with orifices. It relates more particularly to the pneumatic distribution of powders, such as sodium carbonate and bicarbonate, lime, limestone or trona.

There are various contexts in which powders must be distributed in a controlled manner in a given space. In the particular case of flue gas purification, a reactant in pulverulent form must frequently be introduced homogeneously within the flue gas to be purified. In general, the flue gas circulates in a duct or flue. The introduction of a powder may be carried out, in the simplest cases, by an injector located on the wall of the duct. The injector introduces the powder generally perpendicular to the flow direction of the flue gas, with a certain velocity. If the velocity of the powder is sufficiently high relative to the velocity of the flue gas, the powder will be able to be distributed sufficiently homogeneously in the flue gas. When the duct has large dimensions, typically having a diameter of several meters, it becomes difficult however to obtain a satisfactory distribution.

One possible solution to this problem is to use a multiplicity of injectors, penetrating at different depths inside the duct. This however increases the costs of the device.

It has then been envisaged to use a cylindrical pipe provided with orifices spread along the pipe, the pipe being placed in the middle of the flue gas, often perpendicular to its flow direction. The powder is introduced by pneumatic transport at one end of the pipe. It is distributed through outlet orifices, which makes it possible to distribute it more homogeneously within the flue gas. It has been observed that it is difficult to obtain similar flow rates through the various orifices, the orifices placed closest to the feed end of the pipe having a tendency to receive a higher flow rate. This defect is partly resolved by sealing the second end of the pipe, but then a gradual obstruction of the pipe by stagnant powder is witnessed. This unfavourable situation is particularly pronounced when the powder has a tendency to agglomerate, as is the case in the presence of moisture, for example (a powder classified as a class C powder by the Geldart test is said to be agglomerating). The particles constituting the powder are then also qualified as agglomerating. Furthermore, the use of a cylindrical pipe provided with conventional orifices has the disadvantage that the largest particles, in particular those having a diameter greater than about ten microns, make their way from the inside of the pipe to the orifices with more difficulty, which gives rise to a particle size segregation, the large particles having a tendency to stay in the pipe.

Described in U.S. Pat. No. 4,826,088 is a system for the pneumatic distribution, across the ground, of materials in powder form, used in agriculture. The system comprises cylindrical pipes, the cross section of which is split into two parts by welded plates positioned inside the pipe and extending to the outside of this pipe. The two corresponding flows are then directed separately by deflectors. The system does not enable distribution in more than two flows starting from a single pipe, which explains the need for several cylindrical pipes (3 in the variant represented). This system, which is difficult to introduce into a closed space such as a duct, does not enable a stable operation over a prolonged period, in particular when the powder used has a tendency to agglomerate, as it gradually gets blocked. Furthermore, it is complex and costly to produce, in particular when it is necessary to distribute the powder in more than two flows. The latter are then no longer correctly controlled and balanced.

The objective of the invention is to provide a device and process that make it possible to distribute a fluid, and in particular a fluid loaded with agglomerating particles, that is to say particles that have a tendency to agglomerate, in a given space in a simple manner.

Consequently, the invention relates to a device for distributing a fluid in a controlled manner, in particular for distributing a gas loaded with particles, the device comprising a pipe provided with at least one inlet orifice and with a series of outlet orifices spread along the pipe and cut in the side wall of this pipe. The device is characterized in that at least one section of the wall, located downstream of at least one outlet orifice and limited by a section of the edge of this orifice, has a shape such that this section of the edge of this orifice is positioned inside the pipe so that, when the device is in service, the flow direction of the fluid exiting this orifice and travelling along said wall section is controlled by the shape of the latter section.

Preferably, in the device according to the invention, the pipe has an open downstream end, acting as supplementary outlet orifice whose diameter is less than the diameter of the pipe.

BRIEF DESCRIPTION OF THE DRAWINGS

FIG. 2 illustrates the width and the height of the outlet orifice.

FIGS. 3 and 4 illustrate two types of outlet orifice produced as one piece with the pipe at the downstream end of the pipe, without requiring a separate nozzle.

DETAILED DESCRIPTION

Figure 1:
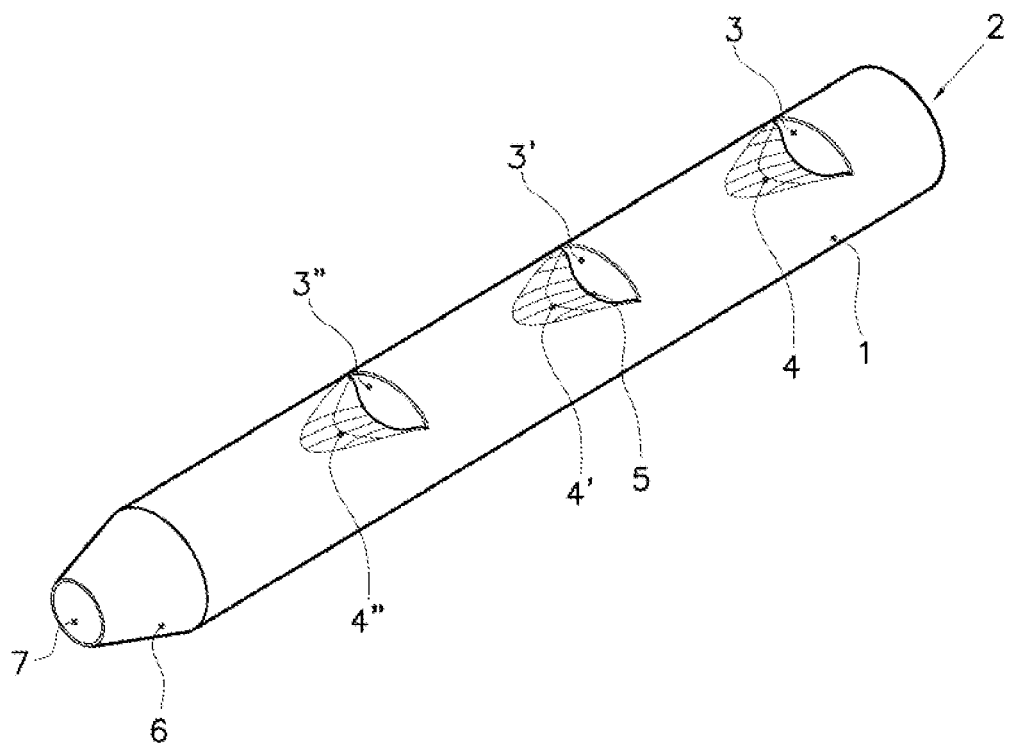
FIG. 1 illustrates one particular embodiment of a device according to the invention which comprises a cylindrical pipe provided with an inlet orifice and three outlet orifices and comprises a nozzle provided with an outlet orifice.

In the device according to the invention, the term "pipe" is understood to mean an elongated hollow body limited by a wall, the length of which is equal to at least 3 times, preferably at least 10 times, the smallest of the other two characteristic dimensions. The pipe may have any shape suitable for the space in which the fluid must be distributed, such as parallelepiped, cylinder, cone, torus, etc. In general, it has a set shape, such as cylinder, cone, parallelepiped. Cylindrical shapes are preferred. The expression "cylindrical shape" is understood to mean a shape generated by the parallel displacement of a straight line along a closed curve. Cylinders of revolution, generated when the curve is a circle, are particularly preferred.

According to one main feature of the invention, at least one section of the edge of at least one outlet orifice is positioned inside the pipe. This positioning results from the shape of the section of the wall downstream of the orifice, adjoined by this edge. Downstream is defined relative to the flow of the fluid within the pipe. The positioning of the edge of at least one outlet orifice inside the pipe means that when the fluid circulates in the pipe, it encounters this section of the edge which cuts the overall flow into two portions. One portion continues to flow along the pipe, whereas the second portion of the flow is guided to the outside of the pipe by the wall section adjoined by the edge in question. In the device according to the invention, it is essential that the positioning inside the pipe of the edge of the orifice is a consequence of the shape of the corresponding section of the wall. This wall section is made as one piece with the rest of the wall of the pipe. It is not therefore composed of a separate part. The shapes corresponding to the various orifices may be identical. However, for a perfectly controlled distribution of the fluid or for other reasons, it may prove necessary for the shapes to be slightly different. In particular, it is possible to vary the depth at which the edge is positioned inside the pipe and therefore the maximum thickness of the section of flow cut by the edge and guided to the outside. This depth, which depends on the number of outlet orifices, is in general greater than 1%, preferably 3%, more preferably 5% of the diameter of the pipe. It is recommended that it does not exceed 60%, preferably 40%, more preferably 30% of the diameter. When the pipe does not have a circular cross section, the term "diameter" is understood to mean the equivalent diameter of a circle having the same surface area as the cross section of the pipe.

The inventors have observed that the essential feature of the invention, according to which the positioning of the edge of the orifice is a consequence of the shape of the corresponding section of the wall, allows optimum guiding of the fluid, which makes it possible to control its distribution. This feature of the device also allows the manufacture of the pipe as a single part, without having to fasten additional parts or couplings thereto. In this way a perfectly smooth surface finish and a regular curvature of the pipe around the orifices are obtained. It is recommended that the roughness Ra (as described in the ISO 4287 standard) of the wall is less than 1 µm. In particular, when the fluid is a gas, in general air, loaded with agglomerating particles, this essential feature of the invention makes it possible to prevent the agglomeration of the particles in the device and therefore to prevent its obstruction during the use thereof.

The device according to the invention makes it possible to use pipes having an open downstream end, acting as a supplementary outlet orifice. When the pipe is, for example, of cylindrical shape, the downstream end of the pipe may remain open. The diameter of this supplementary outlet orifice will then correspond to the diameter of the pipe. It is however recommended for the diameter of this outlet orifice to be controlled and not to correspond identically to the diameter of the pipe. This makes it possible to control the pressure inside the pipe, and consequently to improve the homogeneity of the distribution obtained through the outlet orifices. It is especially possible to provide this downstream end with a nozzle, for example a frustoconical nozzle, intended to obtain the correct diameter of the supplementary outlet orifice. It should therefore be noted that the recommended construction of the pipe as a single part does not exclude the device from comprising inlet and/or outlet nozzles fastened to the ends of the pipe. As a variant, it is, however, preferable to reduce, via deformation, the diameter of the end of the pipe since this makes it possible to avoid the surface defects caused by fastening the nozzle to the pipe. The reduction of the diameter is advantageously such that the supplementary outlet orifice has a diameter less than 0.9, preferably less than 0.75, more preferably less than 0.6 times the diameter of the pipe. If the cross section of the pipe is not circular, the diameters are equivalent diameters.

The edge of the orifices which is positioned in the pipe naturally has the same thickness as the pipe. In general, it is preferred to refine it, for example by grinding. A thickness of less than 1 mm is recommended.

The material from which the device is produced is not critical.

However, it is recommended that the pipe is produced from an easily deformable material such as metals and plastics, in order to obtain optimal control of the positioning of the edges of the orifices. Cold-deformable materials are preferred. Various steels, and in particular stainless steel, work perfectly.

It is recommended that the whole of the pipe is composed of one piece, that is to say of a single part. This is understood to mean that it is not produced by assembling, for example welding or bonding, various parts. The material from which the pipe is composed is a single part. At the microscopic level, it is possible to move over the whole of the pipe without encountering a discontinuity in the composition of the material. In this embodiment, the risks of attachment of the fluid are particularly minimized, which is especially advantageous when it is loaded with agglomerating particles.

The fluid may circulate in the device in various manners, depending on the position of the inlet orifice(s) of the pipe. The pipe may, for example, comprise an inlet orifice located at its centre, which will have the effect that the fluid circulates in opposite directions towards its two ends.

In a recommended variant of the device according to the invention, the pipe is of cylindrical shape, one end of the pipe comprising an inlet orifice and the other end of the pipe comprising an outlet orifice. In this variant, the two orifices in question will have the shape of the cross section of the cylinder. The ends of the cylinder will, however, be able, where necessary, to have nozzles, for example conical nozzles, added thereto, in order to modify the shape or the cross section of the orifices. Since the downstream end of the pipe is open, no agglomeration will occur when the fluid is loaded with agglomerating particles.

The device according to the invention makes it possible to distribute many types of fluids in a controlled manner, for example homogeneously, in a space. This distribution is carried out with a particularly low pressure drop in the device. Pressure drops of less than 50 mbar, preferably of less than 10 mbar are recommended in the case of the pneumatic transport of powders, in particular when the air velocities (measured in the device) are greater than 10 m/s, preferably between 20 and 40 m/s. This low pressure drop enables the device to operate easily in suction mode, such as may be the case when the pressure in the space in which the fluid is distributed is below atmospheric pressure.

The device according to the invention may comprise a large number of outlet orifices. Specifically, the inventors observed that the positioning, inside the pipe, of a section of the edge of the outlet orifices created, via a fluid dynamics effect, a mixing in the pipe of the streams downstream of these orifices. The device advantageously comprises at least three outlet orifices, preferably at least 5, more preferably at least 10. It is however preferred that this number does not exceed 100, preferably 50. The different outlet orifices are preferably separated by a distance of at least one (equivalent) diameter of the pipe. When the device comprises a cylindrical pipe, the outlet orifices may be spread laterally, relative to a generatrix of the cylinder. Generally, they are preferably aligned, relative to such a generatrix.

In the device according to the invention, the fluid exiting the outlet orifices travels along the corresponding section of the wall. When the fluid is loaded with particles, this situation makes it possible to avoid incrustation of the particles on the wall of the pipe adjoining the outlet orifice. This self-cleaning effect enables the device to operate for a long time without requiring a shutdown for the cleaning thereof.

The inventors also observed that it is important that the outlet orifices have an aspect ratio comprised within well defined values. The expression "aspect ratio" is understood to mean the ratio between the width and the height of the orifice. A low aspect ratio makes it possible, for a given surface area of an orifice, to penetrate more deeply within the flow in the pipe, where the flow of the fluid to be distributed is steadiest and highest. This makes it possible to improve the homogeneity of the distribution. Aspect ratios lower than 5, advantageously lower than 4, preferably lower than 3 are recommended. Aspect ratios greater than 1, advantageously between 1.4 and 8, preferably between 1.5 and 3, are particularly recommended.

The space in which the fluid is distributed is in general filled with gas, often air, although it could be filled with a liquid. The fluids distributed may be gases or liquids. They may, in addition, be loaded with solid or liquid particles. The invention is specially suited to gases loaded with solid or liquid particles, in particular to gases loaded with solid particles. The gas is preferably air.

Consequently, the invention also relates to a process for distributing a fluid in a space in a controlled manner, according to which a device according to the invention is placed in said space and a fluid, preferably a gas loaded with particles, is introduced into at least one inlet orifice of the device, the shape of the wall section limited by at least one outlet orifice of the device being adapted to the positioning of the device in the space so that the direction of the fluid travelling along the wall sections makes it possible to obtain the desired distribution.

In this process, the direction of the fluid leaving the device is controlled by the shape of the wall sections travelled along by the fluid. Shapes that are highly curved in a concave manner (when they are observed from the outside of the pipe) promote flows in a direction that forms a large angle relative to the direction of the flow of the fluid inside the pipe, that is to say large deviations of the flow. Moreover, the shape of the wall sections downstream of the various outlet orifices also makes it possible to obtain, in a simple manner, the outlet flow rate distribution of the fluid through these same orifices. For example, a more curved shape positioning the edge of the orifice more deeply inside the pipe will increase the flow rate through this orifice. This flow rate distribution may be, as necessary, either as homogeneous as possible, or, on the contrary, favour the flow rate through certain outlet orifices.

In a first advantageous embodiment of the distribution process according to the invention, the fluid is a gas that it is desired to distribute in the space. This gas is advantageously $NH_3$. This embodiment is advantageous for purifying flue gases that contain nitrogen oxides.

In a second advantageous embodiment of the distribution process according to the invention, the fluid is a gas, preferably air, loaded with solid particles.

In a first variant of this second embodiment, the solid particles have an average diameter $D_{50}$ of greater than 100 μm, preferably greater than 250 μm, particularly preferably greater than 500 μm. The diameters are preferably measured by laser diffraction, for instance with a SYMPATEC® device. The expression "average diameter" of particles having any shape is understood to mean the average diameter of spheres having the same outer surface area as the particles. The diameter $D_{50}$ is the diameter such that 50% of the particles have a size of less than said diameter. In this variant, the particles of large diameter are well distributed, whilst in known devices, these particles have a tendency to not be diverted to the outlet orifices and to remain in the device.

In a second variant of the second embodiment, the solid particles have an average diameter $D_{50}$ of less than 100 μm, advantageously less than 50 μm, preferably less than 10 μm, more particularly less than 1 μm. Indeed, the fine particles have a greater tendency to form agglomerates. Such powders are therefore difficult to distribute in a controlled manner by the processes known before the invention, while avoiding the gradual appearance of agglomerates in the device. The process according to the invention is particularly suitable for them. In this variant, it is preferable to mill the powder for the least amount of time possible before its distribution. For this purpose use is made of in situ mills, directly connected to the distribution device. The gas stream, in this case air, is generated directly at the outlet of the mill. These solid particles comprise, in an especially advantageous manner, sodium bicarbonate, sodium carbonate, lime, limestone or trona. The term "trona" is understood to mean either the natural ore of sodium sesquicarbonate as mined in the deposits of Wyoming, USA, comprising impurities, or sodium sesquicarbonate itself.

In a third variant, which may be combined with the other two, the solid particles have a distribution of diameters having a large breadth (also sometimes called span). The breadth is defined as being: $(D_{90}-D_{10})/D_{50}$. Breadths of greater than 2, advantageously greater than 5, more particularly greater than 10 are recommended. In this variant, the fluid comprises both very fine and very coarse particles, two domains in which the device is particularly advantageous.

In a third recommended embodiment of the distribution process according to the invention, the fluid is a liquid or a gas loaded with liquid particles. The liquid is advantageously ammonia water. In this case, this embodiment is also suitable for the treatment of flue gases that contain nitrogen oxides.

In these three embodiments and the variants thereof, it is advantageous for the particles to comprise a composition intended for the treatment of flue gases. The composition may be reactive or simply absorb certain harmful components of the flue gas.

The invention also relates to the manufacture of the distribution device. The pipe of the device may, for example, be produced in many ways, for example by assembling (bonding, welding) parts that make up the desired shape of the wall of the pipe, adjoining the edge positioned inside said pipe.

However, according to one very advantageous manufacturing process, at least one slit is pierced in a pipe provided with at least one inlet orifice and a pressure is exerted on the section of the pipe wall adjacent to the downstream edge of the slit so as to deform the section of the wall in order to place the downstream edge inside the pipe. In one variant of this process, the slit is pierced substantially perpendicularly to the length of the pipe. The expression "substantially perpendicularly" is understood to mean that the normal to the sectional plane of the slit has a 15° maximum angle relative to the direction of the velocity vector of the fluid at the centre of the pipe and in the sectional plane. The downstream edge of the slit is defined relative to the flow direction of the fluid when the device is in service. In another variant of this process, the normal to the sectional plane of the slit has an angle relative to the opposite direction of the velocity vector of the fluid at the centre of the pipe and in the sectional plane comprised between 15 and 60°, preferably between 30 and 50°. In this second variant, it is possible to have a section of the edge of the related orifice located more upstream, which in certain circumstances allows a better control of the shape of the corresponding section of the wall. In still another variant, the angle is comprised between 15 and 60°, preferably between 30 and 50°, but relative to the direction of the velocity vector (not opposite). The addition of the lengths of the two edges of the slit should be advantageously approximately equal to the perimeter of the orifice that it is desired to make, in that way, in the pipe. This is particularly recommended when the pipe is made from a metallic material and when the manufacturing process is carried out without heating. In one preferred embodiment of the manufacturing process, use is made of a pipe made from a metallic material and having a cylinder of revolution shape. When a sufficient pressure is exerted on the wall section to be deformed, this section then undergoes a buckling and is positioned in one step so as to place the downstream edge of the orifice inside the pipe.

In the manufacturing process according to the invention, it is recommended that the pressure is exerted by means of an article of convex shape, so that the deformation of the wall at least partly adopts the external shape of the article. The shape of the article, but above all its dimensions, should be determined as a function of the desired deformation. It is recommended to use conical or spherical shapes. Spherical shapes have preferably diameters comprised between the (equivalent) diameter of the pipe and one tenth of this diameter. It is advantageous to place inside the pipe a concave matrix, having a shape concavely corresponding to the shape of the convex article, able to support the deformation of the wall of the pipe during the process.

The devices and processes according to the invention are particularly suitable for distributing powders of reactants in flue gases to be treated.

Figure 8:
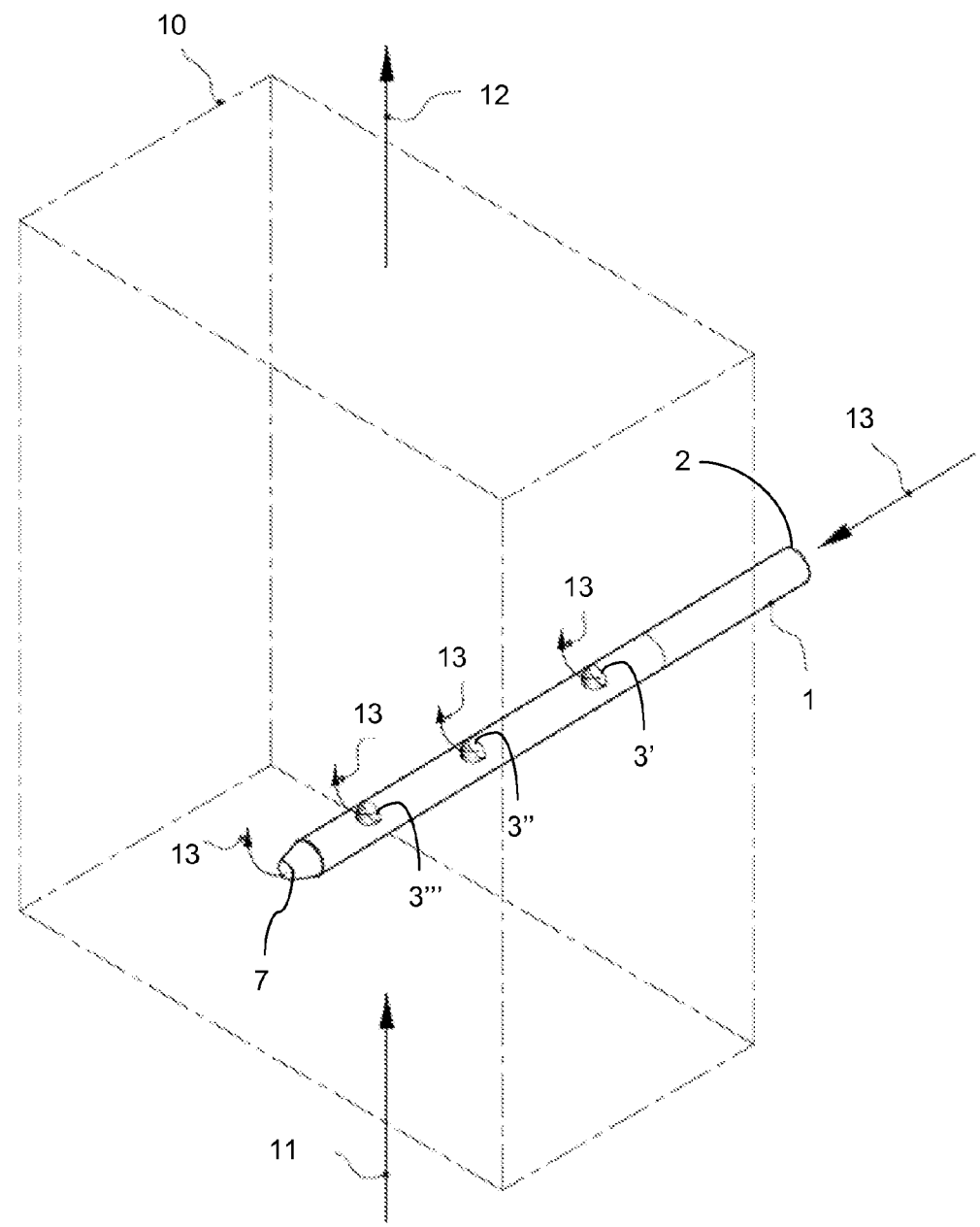
FIG. 8 illustrates a flue gas treatment process according to the invention wherein one particular embodiment of a device according to the invention is placed inside a duct through which a flue gas to be treated travels.

The invention therefore also relates to a flue gas treatment process illustrated in FIG. 8, according to which a device according to the invention is placed inside a duct (10) through which the flue gas (11) to be treated travels, a gas stream (12) loaded with particles comprising a composition intended for the treatment of flue gases is introduced into the inlet orifice (2) of the pipe (1) so as to distribute the loaded gas stream homogeneously in the duct (10) to exit outlet orifices (3'), (3"), (3"') and supplementary outlet orifice (7), the particles react with the flue gas in order to treat it to form a purified gas (13). The purified flue gas is then subjected to a filtration in order to separate it from the particles. The reaction of the particles is here understood in the chemical or physical (absorption) sense. In this flue gas treatment process, use is preferably made of a composition comprising sodium carbonate, sodium bicarbonate, lime, limestone or trona. Trona or sodium bicarbonate is preferred. It is also advantageous for the flue gas to contain acid compounds to be removed such as hydrochloric or hydrofluoric acid or sulphur oxides.

In the case of ducts having large dimensions and when compared with prior art techniques using multiple injectors, the invention allows to simplify the device and reduce its cost. For instance, in the case of a 6×5 injection matrix (6 injection positions along the duct at 5 injection depths), 30 injection tubes were previously necessary. This injection scheme can now be realised for example with 6 devices, each having 5 orifices. If, in the device and the processes according to the invention, multiple (say 3) orifices are made in different directions around the section of the pipe, the number of devices can even be further decreased, for instance to 2. In addition to the reduction in the construction costs, the reduction in the number of devices allows to simplify the control of the flow rates in the different pipes, but also simplify the maintenance and detection of fouling.

Particularities and details of the invention will emerge from the following description of the appended figures. Components bearing the same numbered references are analogous.

FIG. 1 illustrates one particular embodiment of a device according to the invention. It comprises a cylindrical pipe 1 provided with an inlet orifice 2 and three outlet orifices indicated by 3, 3', 3". These outlet orifices are delimited by a section 5 of their edge, placed inside the pipe following the shape of the corresponding sections 4, 4' and 4" of the wall. The device comprises a nozzle 6 provided with an outlet orifice 7.

Figure 2:
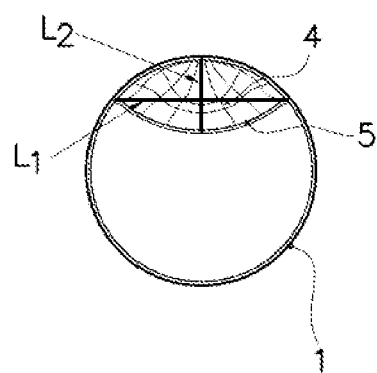
FIG. 2 illustrates a cross section of the device from FIG. 1.

FIG. 2 illustrates a cross section of the device from FIG. 1. Represented therein are the deformed section 4 of the wall and the section 5 of the edge of the orifice. FIG. 2 illustrates the width L1 and the height L2 of the outlet orifice. The aspect ratio is L1/L2.

FIGS. 3a, 3b, 4a, and 4b illustrate two types of outlet orifice at the downstream end of the pipe. These orifices are produced as one piece with the pipe, without requiring a separate nozzle.

Figure 5:
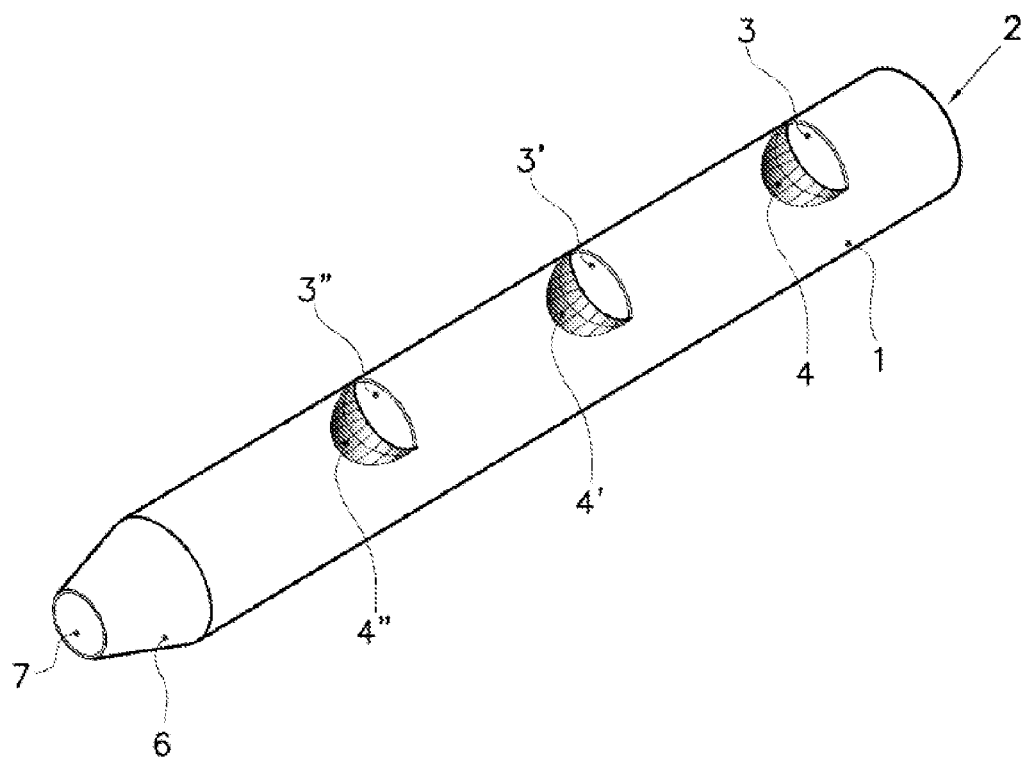
FIG. 5 illustrates a device made by a process according to the invention, using a convex article with a spherical shape, and wherein wall sections (4) have consequently a corresponding spherical shape.

FIG. 5 illustrates a device which has been made by a process according to the invention, using a convex article with a spherical shape, and wherein the sections (4) have consequently a corresponding spherical shape.

Figure 6:
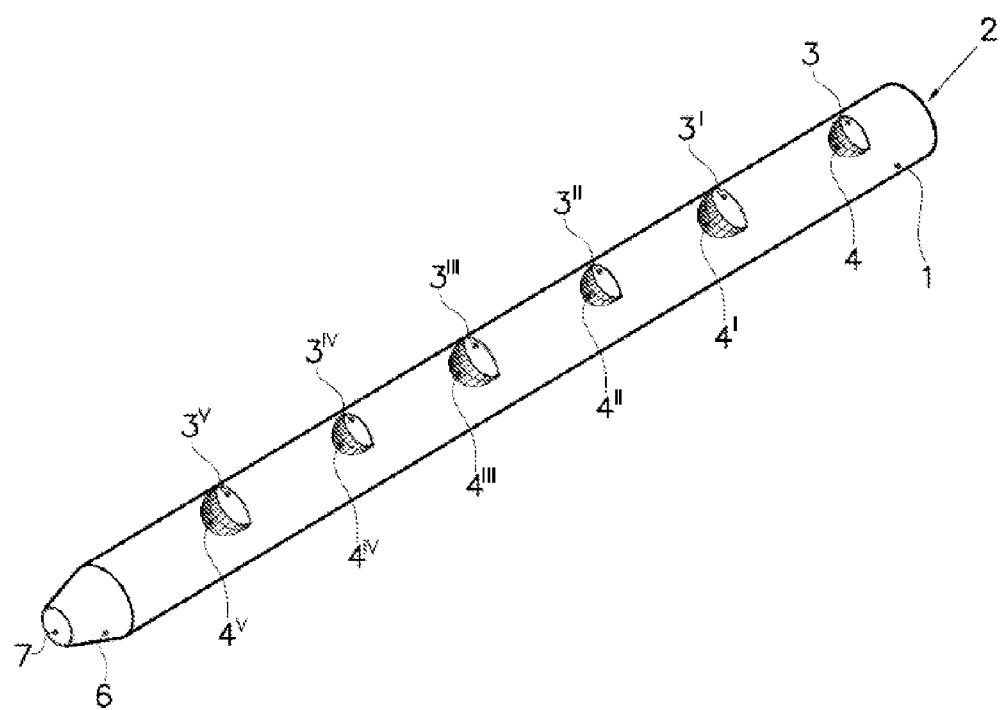
FIG. 6 illustrates a device having two differing sets of three orifices.

FIG. 6 illustrates a device having two differing sets of 3 orifices.

The following examples serve to illustrate the invention.

Figure 7:
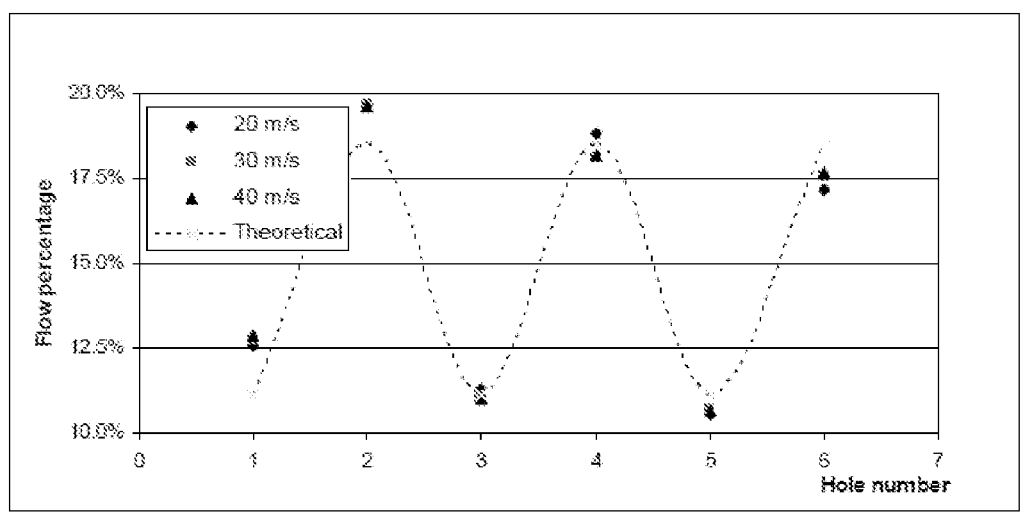
FIG. 7 illustrates the percentage of the total flow exiting from each orifice of the device from FIG. 6.

FIG. 7 represents precentages of total air flow exiting from each of 6 orifices in the device represented in FIG. 6 for three velocities of air introduced in the inlet orifice.

Example 1

The device represented in FIG. 1 was produced in the following manner. A steel cylinder 1 was taken having a length of 2600 mm, an outer diameter of 80 mm and a thickness of 2 mm. Three slits having a depth of 12 mm were cut in a plane perpendicular to the axis of the cylinder, at respectively 450, 1300 and 2200 mm from one of its ends, comprising the inlet orifice. The other end of the cylinder was provided with a frustoconical nozzle having an outlet orifice 7 with a diameter of 40 mm. The wall sections adjacent to the slits and downstream of them (on the side of the outlet orifice 7) were then deformed by exerting a pressure on said sections by means of a steel cone having a diameter of 70 mm and a height of 80 mm. This resulted in the deformed wall sections 4, 4' and 4". The dimensions of $L_1$ and $L_2$ were 60 and 30 mm respectively, resulting in a form factor of 2.

This device was then tested in the following manner. Compressed air was introduced into the inlet orifice 2 under conditions such that the velocity of the air, measured by compact rotating vane anemometer, at the inlet of the pipe 1 is successively equal to 20 and 30 m/s. The velocities of the air exiting the outlet orifices 4, 4', 4" and 7 were then measured. The results are in Table 1. They illustrate the homogeneity of the air flow rate distribution obtained.

TABLE 1

| Inlet velocity | Outlet 3 velocity (m/s) | Outlet 3' velocity (m/s) | Outlet 3" velocity (m/s) | Outlet 7 velocity (m/s) |
|---|---|---|---|---|
| 20.0 m/s | 24.3 | 23.3 | 22.8 | 22.1 |
| 30.0 m/s | 33.2 | 31.5 | 28.2 | 30.1 |

Example 2

The device represented in FIG. 5 was produced in a similar manner. A steel cylinder was taken having a length of 2500 mm, an outer diameter of 168 mm and a thickness of 2.8 mm. Three slits having a depth of 24 mm were cut in a plane perpendicular to the axis of the cylinder, at respectively 450, 1200 and 1950 mm from one of its ends, comprising the inlet orifice. The other end of the cylinder was provided with a frustoconical nozzle having a length of 200 mm and an outlet orifice 7 having a diameter of 75 mm. The wall sections adjacent to the slits and downstream of them (on the side of the outlet orifice 7) were then deformed by exerting a pressure on said sections by means of a quarter of a steel sphere having a diameter of 130 mm. This resulted in the deformed wall sections 4, 4' and 4". The dimensions of $L_1$ and $L_2$ were 115 and 59 mm respectively, resulting in a form factor of 1.9.

Example 3

In example 3, the device represented in FIG. 6 was further produced in the following manner. A steel cylinder was taken having a length of 2695 mm, an outer diameter of 88.9 mm and a thickness of 2.1 mm. A first series of three slits having a depth of 12 mm were cut in a plane perpendicular to the axis of the cylinder, at respectively 774, 1622 and 2470 mm from one of its ends, comprising the inlet orifice. A second series of three slits having a slightly lower depth were similarly cut, at respectively 350, 1198 and 2046 mm. The other end of the cylinder was provided with a frustoconical nozzle 6 having a length of 200 mm and an outlet orifice with a diameter of 40 mm. The wall sections adjacent to the slits and downstream of them (on the side of the outlet orifice) were then deformed by exerting a pressure on said sections by means of a quarter of a steel sphere having a diameter of 70 mm. This resulted in the deformed wall sections 4, 4', 4", etc. . . . The values of $L_1$ and $L_2$ were 61 and 30 mm respectively for the first series of slits, resulting in a form factor of approximately 2. For the second series of slits, the values of $L_1$ and $L_2$ were 53 and 21, resulting in a form factor of 2.5.

This device was then tested in the same manner as the one of example 1, except that the velocities at the inlet of the pipe were successively equal to 20, 30 and 40 m/s. The velocities of the air exiting the outlet orifices were then measured. The results are in Table 2.

TABLE 2

| Inlet velocity (m/s) | Outlet 3 velocity (m/s) | Outlet 3' velocity (m/s) | Outlet 3" velocity (m/s) | Outlet 3'" velocity (m/s) | Outlet $3^{iv}$ velocity (m/s) | Outlet $3^v$ velocity (m/s) |
|---|---|---|---|---|---|---|
| 20 | 17.8 | 16.8 | 16.0 | 16.1 | 14.9 | 14.7 |
| 30 | 27.9 | 26.0 | 24.2 | 23.9 | 23.4 | 23.1 |
| 40 | 37.8 | 34.7 | 32.4 | 32.1 | 31.2 | 31.2 |

The percentage of the total flow exiting from each orifice is represented on FIG. 7.

Examples 1 to 3 show the precise control of the flow rate out of the different orifices which is possible to achieve with the device according to the invention.

Example 4

The device of example 1 was tested for the injection of sodium bicarbonate in the flue gas duct from a coal power station furnace, in order to mitigate its $SO_2$ content. After reaction of the sodium bicarbonate with the $SO_2$ contaminant, the particle separation was performed by an electro-filter. The flue gases had the following properties:

Mean flow rate 250000 dry $Nm^3/h$ (normalised $m^3$: 0° C., 1 atmosphere), with a humidity of 5% vol. and an oxygen content of 6%;
Mean flue gas temperature 180° C.;
$SO_2$ content: 800 $mg/Nm^3$;
Dust content: 16 $g/Nm^3$.

A removal of 68% of the $SO_2$ has been observed. As a comparison, when the sodium bicarbonate was injected, in the same quantity, in the same flue gas and conditions but with a conventional tube of the same length and diameter, having only one orifice at its extremity, the percentage of removed $SO_2$ was only 63%.

Example 5

The device of example 2 has been tested for the injection of sodium bicarbonate in the flue gas duct from another coal power station furnace. The flue gas properties and results of the $SO_2$ mitigation are given in Table 3.

TABLE 3

|  | Test with cut tube | Test with new device | Units |
|---|---|---|---|
| Flue gas flow rate | 88513 | 89965 | $Nm^3$ wet/h |
| $O_2$ | 7.77 | 10.39 | % dry |
| $SO_2$ | 1090 | 1075 | $mg/Nm^3$ dry 6% $O_2$ |
| $SO_2$ removal | 65% | 75% |  |
| Bicarbonate Injection rate | 3 | 1.3 | RSR |

The RSR (Real Stoichiometric Ratio) is defined by the formula:

RSR=(Total mass DSI/total mass $SO_2$ removed)/ISR

Wherein:
The total Mass DSI is the total mass of the dry sorbent injected;
The total mass $SO_2$ removed is the total mass of $SO_2$ removed by the Dry Sorbent Injection (DSI);
ISR is the Ideal Stoichiometric Ratio (If $SO_2$ is removed with sodium bicarbonate, ISR=2.625 tons/ton $SO_2$).

This example shows that by using the device according to the invention, it is possible to improve the $SO_2$ removal and at the same time reduced by a factor of 3 the amount of sodium bicarbonate which is injected, thanks to the better homogeneity of its distribution in the flue gas.

The invention claimed is:

1. A process for treatment of a flue gas, comprising:
placing a device for distributing a gas loaded with solid particles inside a duct through which a flue gas to be treated travels,
wherein the device comprises a pipe (1) provided with at least one inlet orifice (2) and with a series of outlet orifices (3) spread along the pipe (1) and placed in the side wall of said pipe, wherein the pipe has an open downstream end, acting as supplementary outlet orifice (7) whose diameter is less than the diameter of the pipe (1), and wherein at least one deformed section (4) of the wall of the pipe, located downstream of at least one outlet orifice (3) and limited by a section (5) of the edge of such outlet orifice (3), has a concave shape such that said section (5) of the edge of this outlet orifice (3) is positioned inside the pipe (1) so that, when the device is in service, the flow direction of a gas loaded with solid reactant particles exiting such outlet orifice (3) and travelling along said deformed concave wall section (4), is controlled by the shape of said section (5) of the edge;

introducing the gas stream loaded with solid reactant particles into the inlet orifice (2) of the pipe (1) so as to distribute said loaded gas stream homogeneously in the duct;

reacting the solid reactant particles with the flue gas in order to treat said flue gas; and separating said treated flue gas from the solid reactant particles.

2. The flue gas treatment process according to claim 1, wherein the solid reactant particles comprise sodium bicarbonate or trona.

3. The process according to claim 1, wherein the pipe (1) is of cylindrical shape, one end of said pipe comprising the inlet orifice (2) and the downstream end of said pipe being provided with a nozzle (6) comprising the supplementary outlet orifice (7).

4. The process according to claim 1, wherein the outlet orifices (3) are separated by a distance of at least one diameter of the pipe.

5. The process according to claim 1, wherein the supplementary outlet orifice (7) has a diameter less than 0.9 times the diameter of the pipe.

6. The process according to claim 1, wherein the pipe is cylindrical, and wherein the outlet orifices (3) are aligned relative to a generatrix of the pipe.

7. The process according to claim 1, wherein the outlet orifices (3) have an aspect ratio lower than 5.

8. The process according to claim 1, wherein the pipe is composed of a single part.

9. The process according to claim 1, wherein the distribution is carried out with a low pressure drop in the device of less than 50 mbar when the gas stream is air loaded with said solid reactant particles in form of a powder, and when the air velocities measured in the device are greater than 10 m/s.

10. The process according to claim 1, wherein the gas stream is air loaded with said solid reactant particles.

11. The process according to claim 1, wherein the gas stream is loaded with said solid reactant particles having an average diameter $D_{50}$ of less than 100 μm.

12. The process according to claim 1, wherein a powder is milled to form the solid reactant particles directly before being introduced to the distribution device.

13. The process according to claim 1, wherein the solid reactant particles comprise sodium carbonate, sodium bicarbonate, lime, limestone, or trona.

14. The process according to claim 1, wherein the deformed section (4) is made by piercing at least one slit substantially perpendicularly to the length of the pipe (1) provided with at least one inlet orifice and a pressure by means of an article of convex shape is exerted on the section of the pipe wall adjacent to the downstream edge of said slit so as to deform the section of the wall to form said deformed section (4) in order to place the downstream edge of the slit inside the pipe.

15. A process for treatment of a flue gas, comprising:

placing a device for distributing a gas loaded with solid particles inside a duct through which a flue gas to be treated travels, wherein the device comprises a pipe (1) provided with at least one inlet orifice (2) and with a series of outlet orifices (3) spread along the pipe (1) and placed in the side wall of said pipe, wherein the pipe has an open downstream end, acting as supplementary outlet orifice (7) whose diameter is less than the diameter of the pipe (1), and wherein at least one deformed section (4) of the wall of the pipe, located downstream of at least one outlet orifice (3) and limited by a section (5) of the edge of such outlet orifice (3), has a shape such that said section (5) of the edge of this outlet orifice (3) is positioned inside the pipe (1) so that, when the device is in service, the flow direction of a gas loaded with solid reactant particles exiting such outlet orifice (3) and travelling along said deformed wall section (4), is controlled by the shape of said section (5) of the edge;

introducing an air stream loaded with solid reactant particles into the inlet orifice (2) of the pipe (1) so as to distribute said loaded air stream homogeneously in the duct, wherein the distribution is carried out with a low pressure drop in the device of less than 50 mbar when the air velocities measured in the device are greater than 10 m/s;

reacting the solid reactant particles with the flue gas in order to treat said flue gas; and separating said treated flue gas from the solid particles.

* * * * *